(12) United States Patent
Kim et al.

(10) Patent No.: US 9,231,636 B2
(45) Date of Patent: Jan. 5, 2016

(54) DISPLAY APPARATUS AND METHOD OF CONTROLLING THE SAME

(71) Applicant: SAMSUNG ELECTRONICS CO., LTD., Suwon-si (KR)

(72) Inventors: Kwan-young Kim, Seoul (KR); Kyung-hoon Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/955,812

(22) Filed: Jul. 31, 2013

(65) Prior Publication Data

US 2014/0139749 A1 May 22, 2014

(30) Foreign Application Priority Data

Nov. 19, 2012 (KR) .................. 10-2012-0131122

(51) Int. Cl.
*H04N 5/44* (2011.01)
*H04B 1/20* (2006.01)

(52) U.S. Cl.
CPC ..................................... *H04B 1/202* (2013.01)

(58) Field of Classification Search
USPC ......... 348/734, 705, 706, 723, 724, 725, 563, 348/552, 558, 569, 683, 567; 725/39, 40, 725/43, 47, 107, 115, 117, 123, 133, 141, 725/147; 345/158, 661, 633; 340/5.8
See application file for complete search history.

(56) References Cited

U.S. PATENT DOCUMENTS

| | | | |
|---|---|---|---|
| 7,808,529 B2 * | 10/2010 | Kaneko et al. | 348/218.1 |
| 8,068,184 B2 * | 11/2011 | Hicks | 348/734 |
| 8,104,064 B2 * | 1/2012 | Shintani et al. | 725/133 |
| 8,482,577 B2 * | 7/2013 | Kim et al. | 345/600 |
| 8,671,437 B2 | 3/2014 | Tsai | |
| 2004/0162108 A1 * | 8/2004 | Fu et al. | 455/557 |
| 2004/0212743 A1 * | 10/2004 | Yamazaki | 348/734 |
| 2006/0084409 A1 | 4/2006 | Ghadiali | |
| 2007/0057914 A1 * | 3/2007 | Park | 345/156 |
| 2008/0066108 A1 * | 3/2008 | Lee | 725/47 |
| 2008/0231761 A1 * | 9/2008 | Nishikata et al. | 348/734 |
| 2009/0219174 A1 * | 9/2009 | Kikuchi et al. | 341/20 |
| 2010/0013998 A1 * | 1/2010 | Mortensen | 348/558 |
| 2010/0201715 A1 * | 8/2010 | Kim et al. | 345/661 |
| 2010/0295380 A1 * | 11/2010 | Narita | 307/116 |
| 2010/0309389 A1 * | 12/2010 | Hicks | 348/734 |
| 2011/0043372 A1 * | 2/2011 | Ohki | 340/825.22 |
| 2011/0051018 A1 * | 3/2011 | Shintani et al. | 348/734 |
| 2011/0058042 A1 * | 3/2011 | Ida | 348/159 |
| 2011/0102321 A1 * | 5/2011 | Son | 345/158 |
| 2011/0138317 A1 * | 6/2011 | Kang et al. | 715/780 |
| 2011/0138416 A1 * | 6/2011 | Kang et al. | 725/39 |
| 2011/0138444 A1 * | 6/2011 | Kang et al. | 726/3 |
| 2011/0157478 A1 * | 6/2011 | McRae et al. | 348/734 |
| 2012/0026413 A1 | 2/2012 | Beals | |
| 2012/0119888 A1 | 5/2012 | Reeves et al. | |
| 2012/0124245 A1 | 5/2012 | Reeves et al. | |

* cited by examiner

*Primary Examiner* — Jefferey Harold
*Assistant Examiner* — Mustafizur Rahman
(74) *Attorney, Agent, or Firm* — Sughrue Mion, PLLC (57) ABSTRACT

A display apparatus and a method of controlling the same are disclosed. The method of controlling a display apparatus includes: displaying an interface for setting up a remote controller that controls an external device connected to at least one input terminal of the display apparatus; receiving a selection of a user for setting up the remote controller through the user interface; and transmitting remote controller code information corresponding to the external device to the remote controller in accordance with the selection.

14 Claims, 7 Drawing Sheets

DISPLAY APPARATUS AND METHOD OF CONTROLLING THE SAME

CROSS-REFERENCE TO RELATED APPLICATION

This application claims priority from Korean Patent Application No. 10-2012-0131122, filed on Nov. 19, 2012 in the Korean Intellectual Property Office, the disclosure of which is incorporated herein by reference.

BACKGROUND

1. Field

Apparatuses and methods consistent with the exemplary embodiments relate a display apparatus and a method of controlling the same, and more particularly to a display apparatus, in which a universal remote controller is conveniently set up, and a method of controlling the same.

2. Description of the Related Art

In every household, there are various devices such as a television, a digital versatile disc (DVD) player, a home theater, an audio system, etc. Currently, such devices may be controlled by respective remote controllers. Accordingly, the number of remote controllers increases in proportion to the number of devices, and thus it is inconvenient.

To refine the inconveniences, a universal remote controller has been developed to control various devices through one remote controller.

The universal remote controller has information about various manufacturers and various devices, and is capable of controlling the device relevant to the information. Like this, to control a device using the universal remote controller, the universal remote controller has to be first set up for the corresponding device. However, it is difficult for a general user to set up the universal remote controller. Therefore, there will be provided a way to make it easy for anyone to set up the universal remote controller.

SUMMARY

One or more exemplary embodiments may provide a display apparatus, in which a user can easily and conveniently set up a universal remote controller, and a method of controlling the same.

According to an aspect of an exemplary embodiment, a method of controlling a display apparatus comprises: displaying an interface for setting up a remote controller that controls an external device connected to at least one input terminal of the apparatus; receiving a selection of a user for setting up the remote controller through the user interface; and transmitting remote controller code information corresponding to the external device to the remote controller in accordance with the selection.

The receiving the selection of the user may comprise receiving a selection related to one input terminal, to which the external device is connected, among the at least one input terminals.

The method may further comprise receiving information related to the external device through the one input terminal if the one input terminal, to which the external device is connected, is selected among the at least one input terminals.

The method may further comprise retrieving the remote controller code information corresponding to the received information related to the external device.

The retrieving remote controller code information may comprise retrieving the remote controller code information stored in the display apparatus.

The retrieving remote controller information may comprise receiving the remote controller code information from an external server connected to the display apparatus through a network.

The input terminal may comprise a high definition multimedia interface (HDMI) port, and the receiving the information related to the external device may include receiving information related to the external device included in frame information of the HDMI port.

The information related to the external device may comprise information about at least one from among a manufacturer and a product name.

According to an aspect of another exemplary embodiment, an apparatus comprises: a video processor configured to process a video signal; a display unit which displays an image based on the video signal; at least one input terminal to which an external device is connected; a communication unit configured to communicate with a remote controller for controlling the external device; a user input unit through which a user inputs a selection; a controller configured to control an interface for setting up the remote controller, the interface to be displayed on the display unit, and the controller controls remote controller code information corresponding to the external device to be transmitted to the remote controller in accordance with the user's selection input through the interface.

A user may select one input terminal corresponding to the external device among the at least one input terminal through the interface.

If the one input terminal corresponding to the external device is selected among the at least one input terminals, information about the external device is received through the one input terminal.

The remote controller code information may be stored in a database, and the remote controller code information corresponding to the received information related to the external device may be retrieved from the database.

The apparatus may further comprise a storage, wherein the database is provided in the storage.

The apparatus may be connected to an external server through a network, and the database may be provided in the external server.

The one input terminal comprises a high definition multimedia interface (HDMI) port, and the information related to the external device is obtained from frame information of the HDMI port.

The information related to the external device may include information about at least one from among a manufacturer and a product name.

The user interface may comprise one from among an application and a widget.

A Bluetooth method may be used to transmit the remote controller code information to the remote controller.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings.

To use a universal remote controller, a user has to register information of devices to be controlled. The information a user has to register in the universal remote controller includes infrared (IR) code information (e.g., an infrared (IR) key codeset) of a remote controller pertaining to a device. To register the IR code information, a user has to know a manufacturer and model information of the device to be controlled. Thus, a user can set up the universal remote controller after checking up the manufacturer and the model information of the device to be controlled, inputting them into a program, and finding out remote controller code information (i.e., IR key codeset) corresponding to the device.

The manufacturer and model information of the device and the like device information are used to find out the remote controller code information (i.e., IR key codeset) in codeset database. Like this, there are two ways of finding out the remote controller code information (i.e., IR key codeset) by transmitting the device information to the database. That is, there are a method of finding out the remote controller code information (i.e., IR key codeset) in a code book, and a method of inputting the information to a designated program (tool) provided in a computer (e.g., a personal computer) or a TV.

In the case of finding out the remote controller code information (i.e., IR key codeset), it is retrieved based on the kind of device to be controlled and manufacturer information. Generally, there exists a lot of remote controller code information (i.e., IR key codeset) matching with conditions a user inputs. At this time, a user has to find out the remote controller code information (i.e., IR key codesets) matching with the device by registering the remote controller code information (i.e., IR key codesets) one by one. For example, suppose that ten remote controller code information (i.e., 10 IR key codesets) are found out based on the kind and manufacturer of a device. In this case, if the first remote controller code information (i.e., the 1st IR key codeset) matches with the device, the set up is completed at once. However, if the tenth remote controller code information (i.e., the 10th IR key codeset) is the one that matches with the device, the registration has to be attempted all ten times. Thus, if the remote controller code information (i.e., IR key codesets) are found out from the code book and tried to be registered one by one, it is very inconvenient to find out correct remote controller code information (i.e., an IR key codeset) and the set up is impossible without the code book.

In the case of setting up the universal remote controller through the designated program provided in the computer or TV, information about the device has to be transmitted. A user inputs the information about the device into the program through a keyboard or a remote controller, and the program finds out the remote controller code information (i.e., an IR key codeset) corresponding to the device based on the input information. Thus, the operation of finding out the remote controller code information (i.e., the IR key codeset) is performed only after inputting the manufacturer and model name.

As described above, it is not only inconvenient but also difficult for a user to input information about the device one by one in order to set up the universal remote controller.

Accordingly, the following provides a method of automatically, easily and conveniently setting up the universal remote controller without inputting the information about the device one by one.

Figure 1:
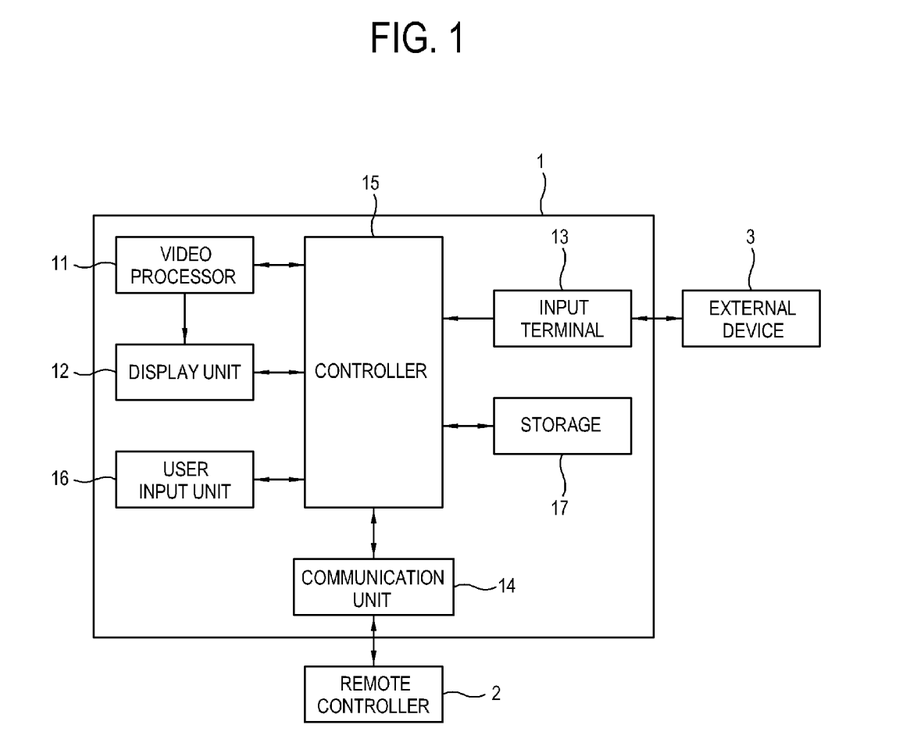
FIG. 1 is a block diagram of a display apparatus according to an exemplary embodiment.

FIG. 1 is a block diagram of a display apparatus according to an exemplary embodiment.

A display apparatus 1 in this exemplary embodiment includes a video processor 11 which processes a video signal; a display unit 12 which displays an image based on the video signal; at least one input terminal 13 to which an external device 3 is connected; a communication unit 14 which communicates with a remote controller 2 of controlling the external device 3; a user input unit 16 through which a user inputs his/her selection; and a controller 15 which controls a user interface for setting up the remote controller 2 to be displayed on the display unit 12 and controls the remote controller code information (IR Key codeset) corresponding to the external device 3 to be transmitted to the remote controller 2 in accordance with a user's selection input through the user interface.

The display apparatus 1 may include a television (TV) or the like where a user most uses the remote controller 2. Thus, a user can conveniently set up the remote controller 2 through the TV. Hereinafter, the TV will be described as an example of the display apparatus 1.

Also, the remote controller 2 may include a universal remote controller, and the external device 3 may include various devices such as a digital versatile disc (DVD) player, a home theater, an audio system, etc.

The video processor 11 processes a video signal received by a broadcasting receiver (not shown) from a broadcasting station to be displayed on the display unit 12, which may include a scaler or the like.

The display unit 12 may display an image and a user interface, based on the video signal processed by the video processor 11, which may include various display methods such as a liquid crystal display (LCD), a plasma display panel (PDP), an organic light emitting diode (OLED), etc.

The input terminal 13 is provided in the display apparatus 1 and connects with the external device 3, which may include a high definition multimedia interface (HDMI) port or the like.

The communication unit 14 communicates with the remote controller 2 and receives a control signal from the remote controller 2, or transmits the remote controller code information (IR Key codeset) from a storage 17 of the display apparatus 1 to the remote controller 2. At this time, the display apparatus 1 and the remote controller 2 may communicate with each other through Bluetooth. Also, the communication unit 14 allows the display apparatus 1 to connect with a server (18, referring to FIG. 2) through a network.

The user input unit 16 allows a user to input his/her selection, which may include a control button (not shown) or a touch pad (not shown). Through the user input unit 16, a user may select the input terminal 13 corresponding to the external device 3 desired to be controlled by the remote controller 2, among the input terminals 13 to which the external devices 3 are connected.

Meanwhile, if the display apparatus 1 is first set up to communicate with the remote controller 2, the user input unit 16 may be replaced with the control button (not shown) or the touch pad (not shown) provided in the remote controller 2. In this case, a user may input his/her selection through the remote controller 2 instead of the user input unit 16.

The controller 15 controls the user interface for setting up the remote controller 2 to be displayed on the display unit 12, and controls the remote controller code information (IR key codeset) corresponding to the external device 3 to be transmitted to the remote controller 2 in accordance with the user's selection input through the user interface.

Also, the controller 15 may receive information about the external device 3 through the input terminal 13 if one of the input terminals 13 corresponding to the external device 3 is selected among at least one input terminal 13.

Here, the input terminal 13 includes an HDMI port (not shown), and the information about the external device 3 may be obtained from frame information of the HDMI port (not shown).

The information about the external device 3 may include information about at least one of a manufacturer and a product name.

For example, the information about the external device 3 may be included in the frame information of the HDMI port (not shown) as shown in Table 1.

TABLE 1

| Information about the external device 3 included in the frame information | Manufacturer/Product name |
| --- | --- |
| [0x53][0x41][0x4D][0x53] [0x55][0x4E][0x47][0x00][0x48] [0x54][0x2D][0x44][0x36] [0x35][0x30][0x30] | SAMSUNG HT-D6500 |

Meanwhile, the remote controller code information is stored in a database. Thus, if the information about the external device 3 is received, the corresponding remote controller code information is retrieved in the database. The database may be included in the storage 17 provided in the display apparatus 1.

Figure 2:
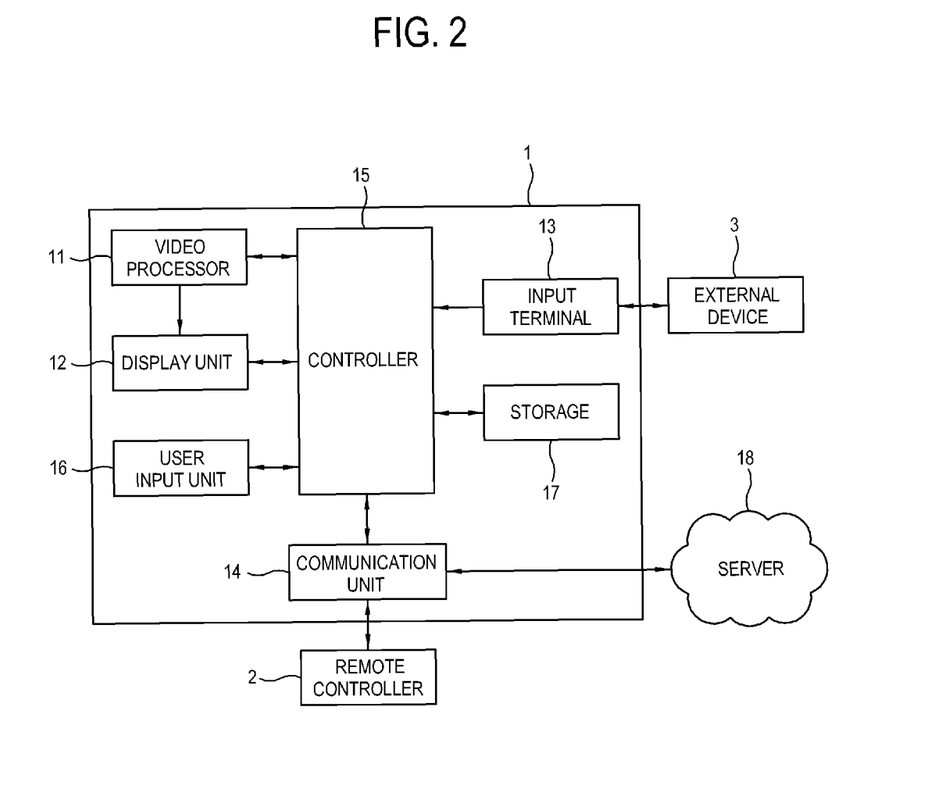
FIG. 2 is a block diagram of a display apparatus according to another exemplary embodiment.

However, if the remote controller code information corresponding to the information about the external device 3 is not stored in the database of the storage 17, as shown in FIG. 2, the controller 15 may receive the corresponding remote controller code information from the database provided in the server 18 connected through the network.

Meanwhile, the user interface may include a program executed by an application or a widget.

Figure 3:
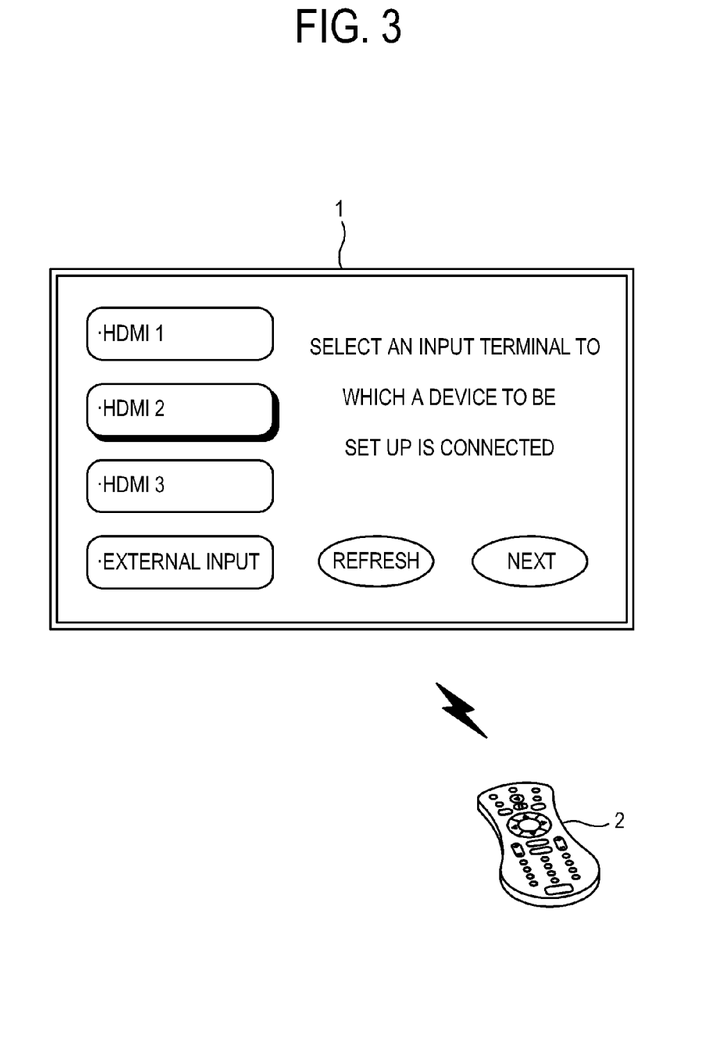
FIGS. 3 and 4 show an example of a user interface for setting up a universal remote controller according to an exemplary embodiment.
Figure 4:
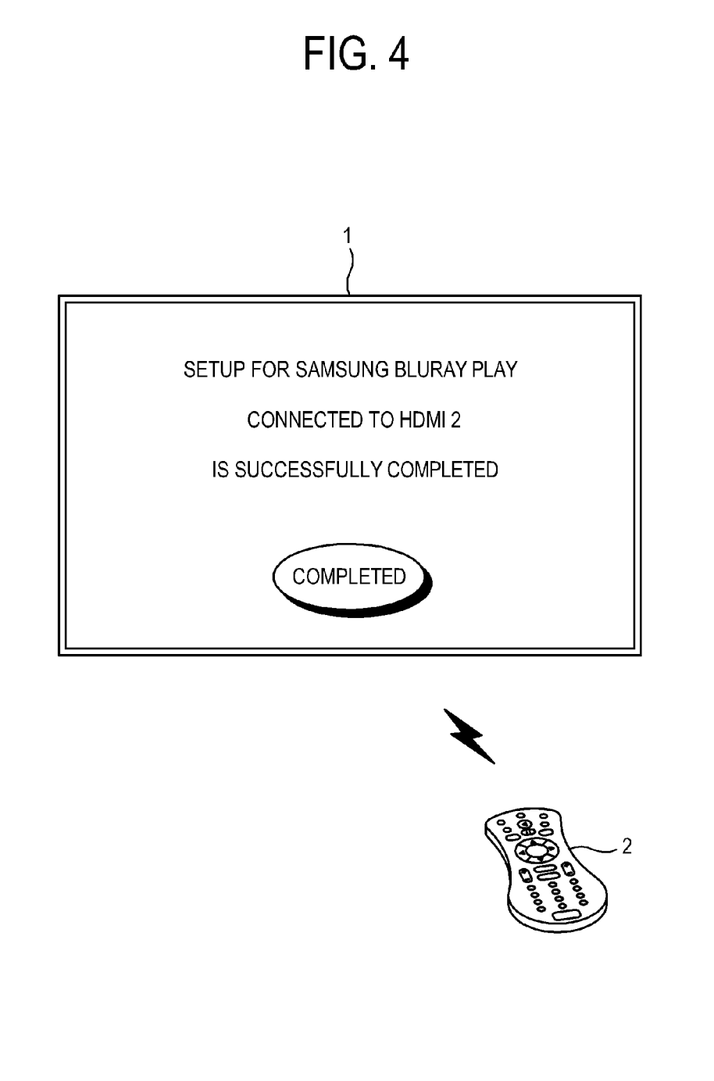

FIGS. 3 and 4 show an example of a user interface for setting up a universal remote controller according to an exemplary embodiment.

For example, suppose that a Blu-ray player is connected to an HDMI 2 port of the display apparatus 1, and a user wants to set up the remote controller 2 for controlling the Blu-ray player.

At this time, the user interface allows a user to select at least one input terminal that the display apparatus 1 has. Referring to FIG. 3, a user selects the HDMI 2 port among various input terminals. Selecting the HDMI 2 port among various input terminals is enough to automatically set up the remote controller 2 so that the device connected to the selected HDMI 2 port can be controlled as shown in FIG. 4.

Although a user just selects one input terminal, the controller 15 of the display apparatus 1 receives device information from the external device 3 connected to the selected input terminal, retrieves the remote controller code information matching with this device information from the database, and transmits the remote controller code information corresponding to the device information to the remote controller 2, thereby registering the set up.

As described above, the frame information of the HDMI port is used and automatically received, so that a user needs not to input the information about the device one by one, thereby allowing a user to easily and conveniently set up the remote controller 2.

Figure 5:
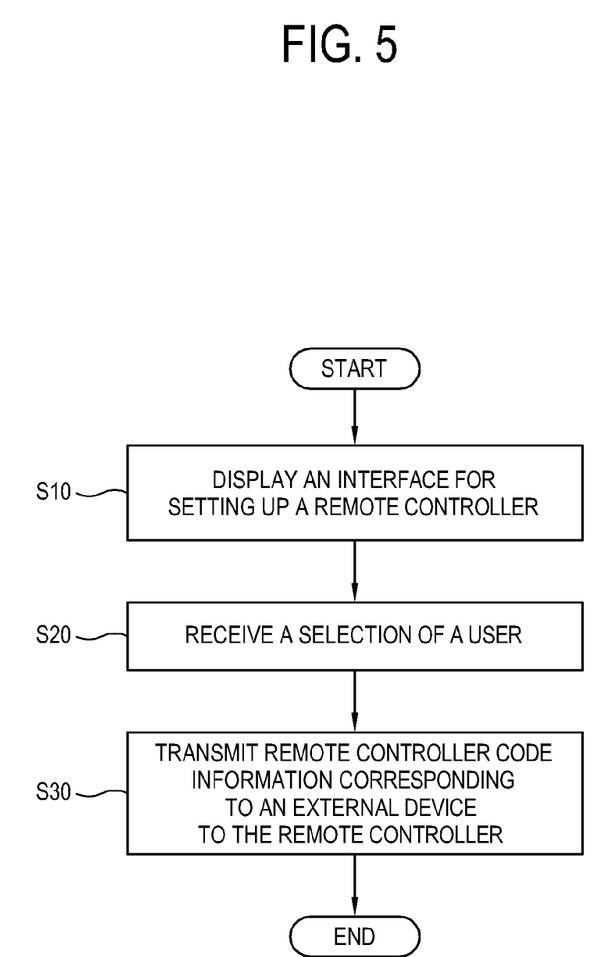
FIG. 5 is a flowchart for explaining a method of controlling the display apparatus according to an exemplary embodiment.

FIG. 5 is a flowchart for explaining a method of controlling the display apparatus according to an exemplary embodiment.

As shown in FIG. 5, an application or a widget is executed to display the user interface on the display unit 12 in order to set up the remote controller 2 for controlling the external device 3 connected to at least one input terminal 13 of the display apparatus 1 (S10).

Next, a user's selection input for setting up the remote controller 2 is received through the user interface (S20).

Then, the remote controller code information corresponding to the external device is transmitted to the remote controller 2 in accordance with a user's selection (S30).

Figure 6:
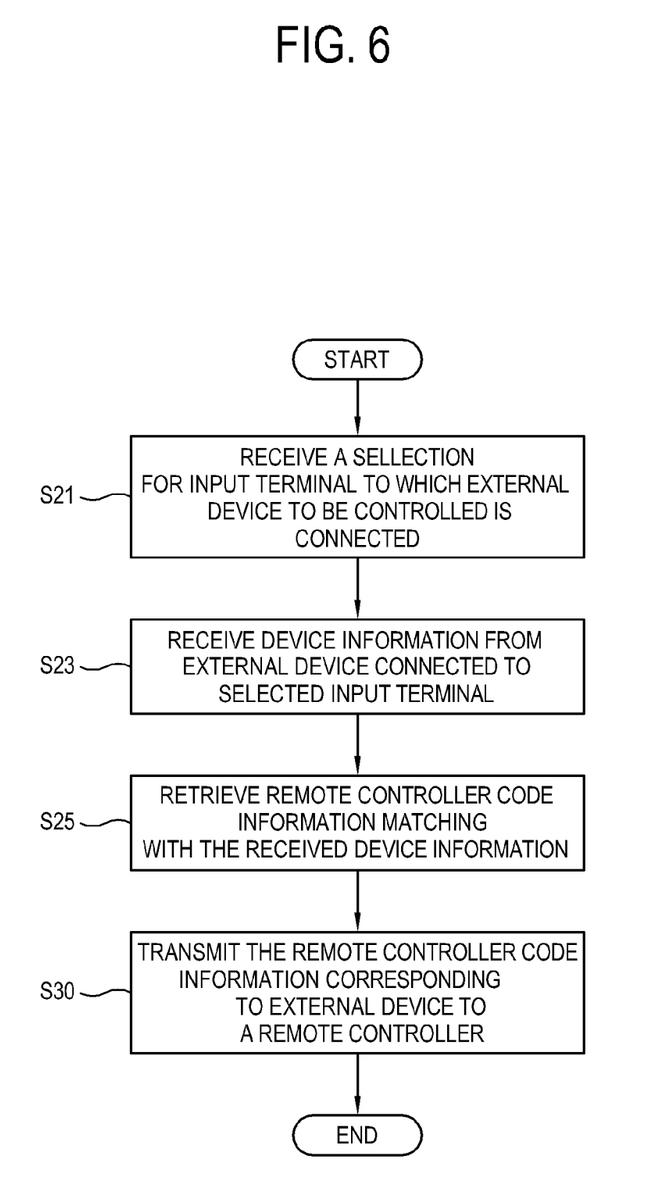
FIG. 6 is a flowchart showing more detailed operations of inputting a user's selection in FIG. 5.

FIG. 6 is a flowchart showing more detailed operations of inputting a user's selection in FIG. 5.

As shown in FIG. 6, a user's selection includes selecting the input terminal 13 to which the external device to be controlled among many external devices 3 displayed on the user inter face is connected (S21).

When a user selects the input terminal 13, the information of the external device 3 connected to the selected input terminal 13 is received through the input terminal 13 (S23).

The received information about the external device 3 is transmitted to and compared with the database information, so that the remote controller code information is retrieved matching with the information about the external device 3 (S25).

Then, the matched remote controller code information is transmitted to the remote controller 2 (S30).

Figure 7:
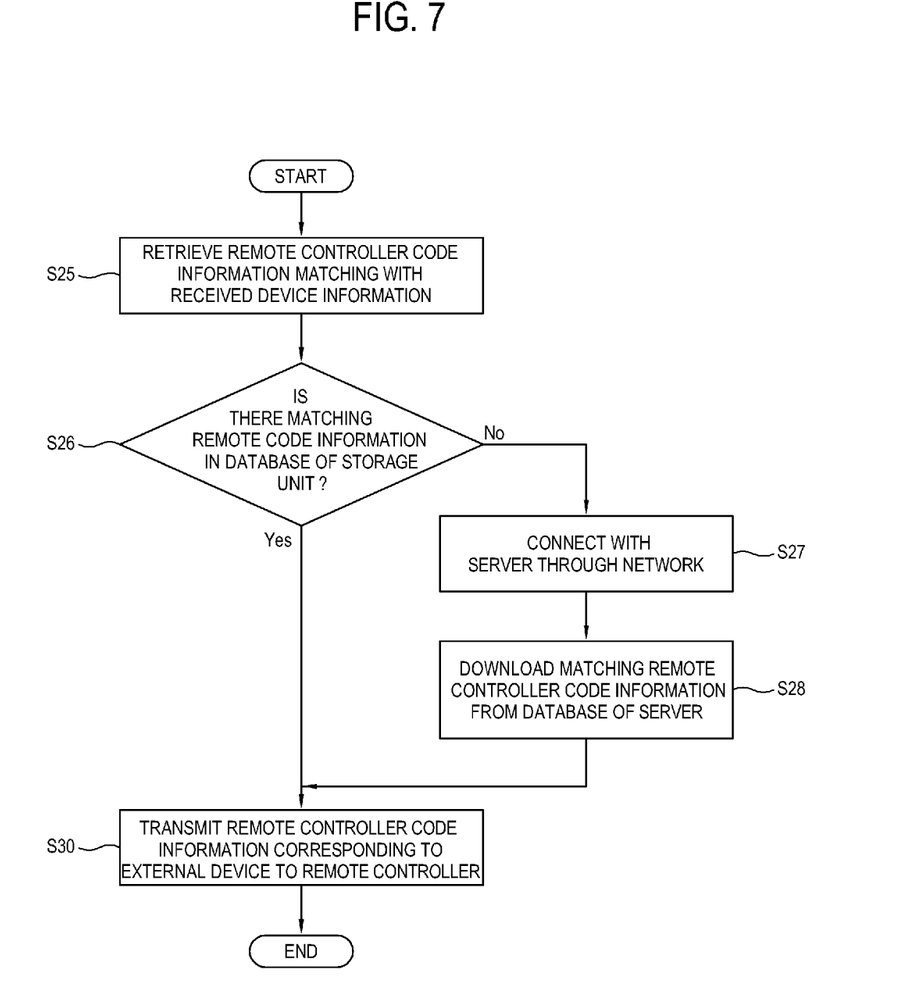
FIG. 7 is a flowchart showing more detailed operations of retrieving remote controller code information in FIG. 6.

FIG. 7 is a flowchart showing more detailed operations of retrieving remote controller code information in FIG. 6.

If the remote controller code information corresponding to the external device 3 is retrieved from the database (S25) and the matched remote controller code information is found out from the database stored in the storage 17 of the display apparatus 1 (Yes from S26), the matched remote controller code information is transmitted to the remote controller 2 (S30).

However, if no matched remote controller code information is found out from the database stored in the storage 17 of the display apparatus 1 (No from S26), the display apparatus 1 connects with the server through the network (S27) and retrieves and downloads the matched remote controller code information from the database of the server (S28). The downloaded remote controller code information is transmitted to the remote controller 2.

The remote controller 2 that receives the remote controller code information from the display apparatus 1 completes the set up for controlling the corresponding external device 3

As described above, the information about the device is automatically received using the frame information of the HDMI port even if a user does not input the information one by one, thereby easily and conveniently setting up the remote controller 2.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A method of controlling a display apparatus, the method comprising:
    displaying an interface for setting up a remote controller that controls an external device connectable to one of a plurality of input terminals of the display apparatus;
    selecting one of the plurality of input terminals, which is connected to the external device, through the interface by a user's input;
    receiving device information of the external device corresponding to the selected input terminal of the display apparatus; and
    transmitting, from the display apparatus, remote controller code information corresponding to the received device information of the external device to the remote controller,
    wherein the display apparatus and remote controller are separate devices.

2. The method according to claim 1, further comprising retrieving the remote controller code information corresponding to the received information related to the external device.

3. The method according to claim 2, wherein the retrieving the remote controller code information comprises retrieving the remote controller code information stored in the display apparatus.

4. The method according to claim 2, wherein the retrieving the remote controller code information comprises receiving the remote controller code information from an external server connected to the display apparatus through a network.

5. The method according to claim 1, wherein the input terminal comprises a high definition multimedia interface (HDMI) port, and
    the receiving information related to the external device comprises receiving information related to the external device from frame information of the HDMI port.

6. The method according to claim 5, wherein the information related to the external device comprises information related to at least one from among a manufacturer and a product name.

7. A display apparatus comprising:
    a video processor configured to process a video signal;
    a display unit which displays an image based on the video signal;
    a plurality of input terminals to which an external device is connectable;
    a communication unit configured to communicate with a remote controller for controlling the external device;
    a user input unit configured to receive an input signal;
    a controller configured to control the display unit to display an interface for setting up the remote controller, select one of the plurality of input terminals, which is connected to the external device, through the interface by a user's input, receive device information of the external device corresponding to the selected input terminal of the display apparatus, and transmit remote controller code information corresponding to the received device information of the external device to the remote controller,
    wherein the display apparatus and remote controller are separate devices.

8. The display apparatus according to claim 7, wherein the remote controller code information is stored in a database, and
    the remote controller code information corresponding to the received information related to the external device is retrieved from the database.

9. The display apparatus according to claim 8, further comprising a storage,
    wherein the database is provided in the storage.

10. The display apparatus according to claim 8, wherein the apparatus is connected to an external server through a network, and
    the database is provided in the external server.

11. The display apparatus according to claim 7, wherein the one input terminal comprises a high definition multimedia interface (HDMI) port, and
    the information related to the external device is obtained from frame information of the HDMI port.

12. The display apparatus according to claim 11, wherein the information related to the external device comprises information about at least one from among a manufacturer and a product name.

13. The display apparatus according to claim 7, wherein the interface comprises one from among an application and a widget.

14. The display apparatus according to claim 7, wherein a Bluetooth method is used to transmit the remote controller code information to the remote controller.

* * * * *